UNITED STATES PATENT OFFICE.

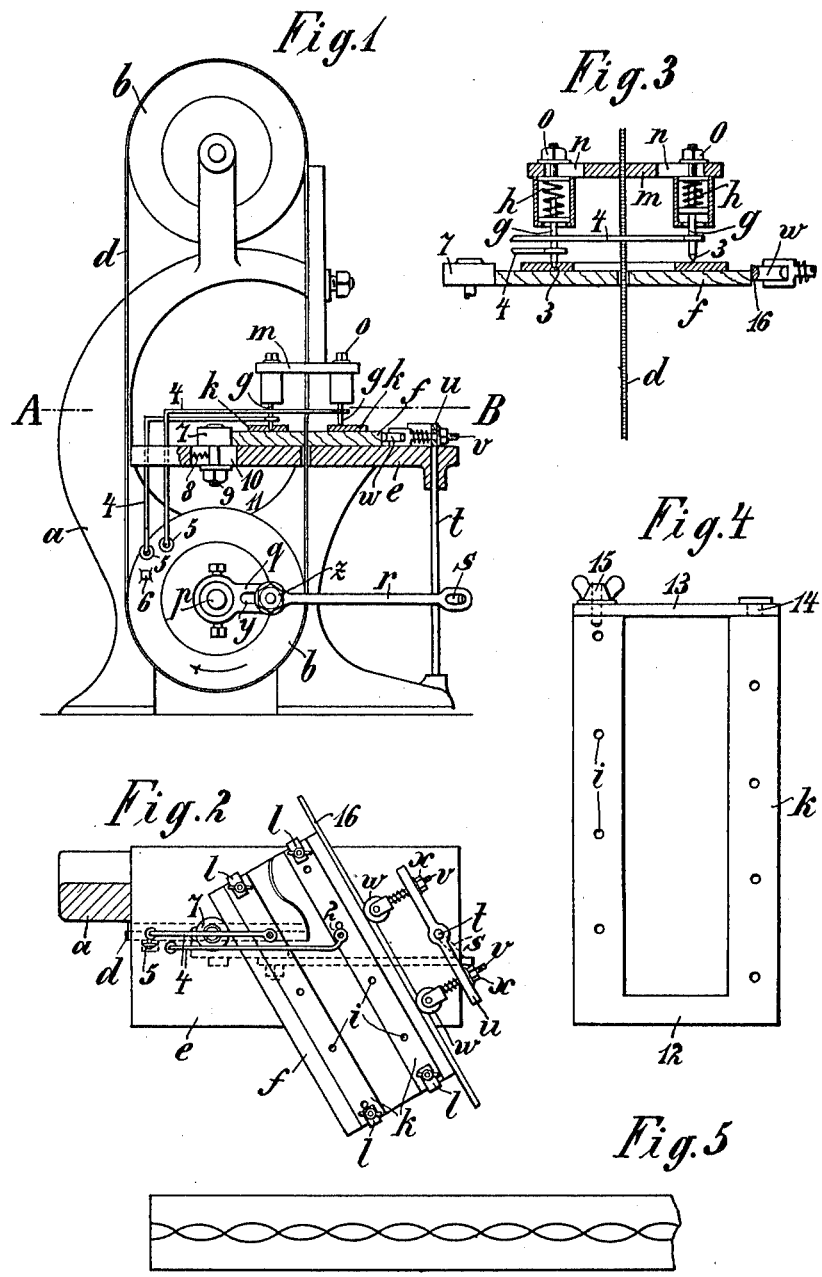

GEORG BERNSTEIN, OF BRESLAU, GERMANY.

DEVICE FOR PRODUCING CONTINUOUS WAVELIKE INCISIONS IN WOOD, &c.

1,001,338. Specification of Letters Patent. Patented Aug. 22, 1911.

Application filed February 7, 1911. Serial No. 607,160.

*To all whom it may concern:*

Be it known that I, GEORG BERNSTEIN, a citizen of the German Empire, and residing at Breslau, German Empire, have invented a new and useful Device for Producing Continuous Wavelike Incisions in Wood, Linoleum, and the Like, of which the following is a description.

The present invention consists of a machine for cutting wood or other material in a wave-like line or producing wave-like incisions in the same, and this result is attained by swinging the wood or material to be cut alternately on pivots arranged at opposite sides of the material, thus producing a waved line of great accuracy which may be employed as hereinafter set forth for producing fancy woodwork in great variety.

One embodiment of the present invention is illustrated in the accompanying drawings, in which similar letters and numerals of reference denote similar parts throughout the several views.

Figure 1, is a front elevation partly in section of the machine, Fig. 2 is a section on line A—B of Fig. 1. Fig. 3 is a side elevation of the pivots for the work drawn to larger scale, Fig. 4 is a plan of a modified form of frame for holding the wood or other material being worked, and Fig. 5 illustrates a piece of the finished work.

In the present embodiment a band-saw $d$ is employed, running over guide-rolls $b$ mounted in the frame $a$ of the machine. The table $e$ is arranged at a suitable height between the two guide rolls.

The pivots on which the work is swung alternately during the cutting operation are arranged above the board or work $f$, one on each side of the saw, and these pivots $g$ are normally pressed downward by means of springs $h$ (Fig. 3). In order to enable these pivots to operate properly they must engage in bearings or depressions $i$ either in or rigidly attached to the work, and since the wood being worked would be disfigured by making a series of depressions at each side of the incision along the same it is advantageous to employ metal rails, such, for instance, as indicated at $k$, which are clamped to the wood by means of clamps $l$. These rails are clamped to the wood at a distance apart corresponding to the distance apart of the two pivots $g$ when the work is in a slanting position, as will be readily understood on reference to Fig. 2. In order to enable the production of curves of different radii the pins $g$ are mounted in slots $n$ of the carrier arm $m$, which also serves as a guide for the saw, and are adjustable therein by means of clamped screws $o$. In order to enable the pivots to engage alternately with orifices or depressions $i$ at opposite sides of the saw, the board being cut together with the frame or rails $k$ has to be swung or reciprocated backwardly and forwardly, and this is effected automatically by the following means: The driving shaft $p$ for the lower saw roll is provided with a crank arm $q$ in which the connecting rod $r$ is adjustable in a slot $y$ by means of a clamping screw $z$. The end of the connecting rod $r$ engages an arm $s$ keyed to a vertical spindle $t$, on the upper part of which is mounted an arm $u$, the said spindle being pivotally supported at the lower end in the machine frame and at the upper end in the table $e$. At each end of the arm $u$ is mounted a roll $w$ on a spindle $v$ normally spring-pressed against the rail 16 either attached to the work or to the frame in which the latter is supported and the distance of the said rolls $w$ from the arm $u$ may be adjusted by means of clamping screws $x$ (Fig. 2). The arm $u$ might be connected directly to the work, but the spring connection above described is advantageous as it avoids jamming and also enables an adjustment for various sizes of work and decreases the friction. The rail 16 is advantageously longer than the work to insure that the latter is properly guided at the commencement and end of the cutting operation. The curve of the cut or incision may be varied by altering the position of the pivot of the connecting rod $r$ in the slot $y$ of the crank arm $q$ as will be readily understood.

The pivot on which the work is swung is automatically alternately changed by means of the following mechanism: When the work is in the position illustrated in Figs. 1 and 2 the left hand pivot $g$ is serving to form the curve and the connecting rod $r$ is at its extreme lateral position, so that at this moment it is necessary to shift the pivot on which the work is swung to the opposite side of the center line, *i. e.* the righthand pivot must descend into the corresponding depression of the rail indicated at 2, whereupon the arm $u$ on the further operation of the machine will swing the work around the righthand pivot. The moment the righthand pivot comes into engagement with the corresponding depression $i$ of the opposite rail $k$ the lefthand pivot must of course be disengaged from its recess or depression so as not to lock the work but to enable it to be swung on the righthand pivot. With this end in view the lower ends of the two pivots are tapered or made conical as at 3 to allow for a slight turn which takes place while the pivots are being changed.

The pivots are automatically depressed into their respective holes by means of the springs $h$ and are lifted out of the same at the proper moment by means of the lifter rods or levers 4 having rolls 5 at their lower ends and being suitably guided in the table of the machine. The rod 4 for the righthand pivot has its roll 5 depending in the path of movement of the end of the crank $q$ and as the latter comes around the rod 4 and with it the righthand pivot $g$ will both be raised, disengaging the latter from the rail. The rod 4 of the lefthand pivot is operated by a projection 6 on the lower saw roll $b$, as will be readily understood on reference to Fig. 1. The projection 6 and the crank $q$, as also the length of the depending ends of the rods 4, are dimensioned to disengage their respective pivots the moment the desired curve has been performed.

The work itself is supported at the side opposite the rolls $w$ by means of a spring-pressed guide roll 7 mounted in a slot 10 (Fig. 1) of the table, in which it may be clamped by means of a nut 11 on the stud 9, which, however, should be loosely screwed up so as to enable the spring 8 to have a certain amount of play room.

From the above description it will be seen that work of various sizes may be performed by varying the eccentricity of the crankpin, by altering the distance of the rolls $w$ from the arm $u$ or by varying the distance of the two rails $k$ and the pivots $g$ from each other, so that a great variety of curves and wavelike incisions or cuts may be performed in wood or other material of varying width and thickness. Still further adjustment is possible by making the projection 6 removable, so that its position in the roll $b$ may also be varied at will.

Fig. 4 illustrates a modified form of frame $k$ for the work. In this case the two rails $k$ having the orifices or depressions $i$ are connected up at one end by the crossbar 12 and at the other end by a swinging bar 13 pivotally supported at 14 on one rail $k$ and adapted to be clamped to the opposite rail by means of a clamp screw 15.

Fancy woodwork may be made by means of the present machine by cutting the wood in two in the form of a waved line and in the space produced by the removal of the wood by the saw securing a thin line of veneering and then fixing the two pieces of wood together again and cutting a waved line to intersect the original waved line at equal distances, thereafter inserting a veneer in the incision last produced and producing the effect illustrated at Fig. 5. It will be readily understood that a great diversity of patterns may be produced in this manner, and it has been shown in practice that the incisions or cuts are so accurately performed as to render it possible to cut off the thinnest veneers in a waved line.

Moldings may also be produced by means of the present machine and by fixing at either side of the material of which the molding is to be made strips of wood or other material to receive the holes for the pivots and subsequently removing such strips. Veneers cut by means of the present machine may be employed for making plates or slabs of which light traveling trunks are made.

Instead of a saw a cutter tool of any other suitable description might be employed for making incisions or grooves which could then be filled out with veneering. In the case of very thick blocks of wood or other material it may be necessary to provide a pivot at the top and bottom of the material so as to secure proper guiding of the same, and in this case suitable means would have to be employed for operating each pair of pivots simultaneously. The pivots might be arranged on the work and guideways for the same on the machine-frame, as will be readily understood by any one skilled in the art.

I claim as my invention:

1. In a machine for working wood and other materials, the combination of cutting mechanism and means for swinging the material being operated upon in a series of alternating curves to produce a wave-like incision.

2. In a machine for working wood and other materials, the combination of cutting mechanism and pivotal supports for the material being operated upon at opposite sides of a center line of the same, and means for alternately bringing the said pivots into operation to act as the swinging point of the material.

3. In a machine for working wood and other materials, the combination of cutting mechanism, a pair of pivots to engage the material being operated upon, means for vertically reciprocating the said pivots so as to alternately bring each into engagement with the work and means for swinging the work on whichever pivot is in engagement therewith.

4. In a machine for working wood and other materials, the combination of a bandsaw, a table and suitable means for supporting the same, a pair of pivots normally spring-pressed downwardly mounted above the said table, a series of recesses provided at alternating sides of the material being worked, means for bringing one pivot alternately into engagement with one recess of the work, and means for swinging the work around said pivot.

5. In a machine for working wood and other materials, the combination of a band-saw, a saw-table and means for supporting the work thereon, rails attached to the work at either side of its center line and a series of recesses in the side rails, a pair of vertical movable downwardly spring-pressed pivots engaging the said recesses at opposite sides of the work, means for raising one pivot when the other is in engagement and vice versa, and means for swinging the work about the pivot which is in engagement therewith.

6. In a machine for working wood and other materials, the combination of a band-saw and a saw-table, a frame to support the work and recesses in the said frame one at each side of a center line of the work, vertical reciprocating pivots to engage said recesses and means for alternately reciprocating said pivots to engage the work alternately at each side of the same, a horizontal reciprocating lever in engagement with one side of the work frame, means for yieldingly supporting the opposite side of the work-frame, and means for swinging the said lever horizontally to swing the work around one of the pivots, substantially as described.

7. In a machine for working wood and other materials, the combination of a band-saw, a work table, a frame to support the work thereon having two sets of recesses one at each side of the saw, a pair of vertical reciprocating pivots normally spring-pressed downwardly to alternately engage the recesses at each side of the work, means for raising one pivot when the other comes into operation, a rail longer than the work arranged at one side of the same, a horizontal reciprocating lever adapted to press with yielding pressure against the said rail, means for yieldingly supporting the opposite side of the work, and means for reciprocating the said lever to swing the work alternately on the pivots, substantially as described.

8. In a machine for working wood and other materials, the combination of a band-saw, a saw-table, means for supporting the work thereon, recesses in the said supporting means at each side of the band-saw, a pair of vertical reciprocating pivots to engage the said recesses alternately at each side of the saw, springs to normally depress said pivots and lever arms extending from the pivots below the table, means in connection with the lower band-saw disk to alternately raise said levers and their respective pivots, and means for swinging the work around each pivot as it engages the same.

9. In a machine for working wood and other materials, the combination of a band-saw and a saw-table, a frame to support the work thereon, having two sets of recesses therein, one at either side of the saw, a pair of vertical reciprocating pivots to alternately engage one of the said recesses at each side of the saw, means for raising one pivot when the other comes into engagement, a horizontal rocking lever and means for enabling both arms of the same to press with yielding pressure on one side of the work, a spring-mounted roll in the table of the machine to support the opposite side of the work, and means for swinging the said rocking lever from the driving shaft of the lower saw-roll, substantially as described.

In testimony whereof I affix my signature in the presence of two witnesses.

GEORG BERNSTEIN.

Witnesses:
 HENRY HASPER,
 WOLDEMAR HAUPT.

---

Copies of this patent may be obtained for five cents each, by addressing the "Commissioner of Patents, Washington, D. C."